United States Patent [19]

Hentschel et al.

[11] Patent Number: 4,598,199
[45] Date of Patent: Jul. 1, 1986

[54] SAFETY DEVICE FOR CONTROLLING A LIGHT SIGNAL GENERATOR BASED ON FIBER POSITION

[75] Inventors: Christian Hentschel, Holzgerlingen; Wolfgang Schmid, Stuttgart, both of Fed. Rep. of Germany

[73] Assignee: Hewlett-Packard Company, Palo Alto, Calif.

[21] Appl. No.: 549,362

[22] Filed: Nov. 3, 1983

[51] Int. Cl.⁴ .............................................. G01V 9/04
[52] U.S. Cl. ................................. 250/222.1; 250/227
[58] Field of Search ...... 350/96.10, 96.15, 96.2–96.22; 250/222.1, 221, 227

[56] References Cited

U.S. PATENT DOCUMENTS

| | | |
|---|---|---|
| 3,934,965 | 1/1976 | Wiseman et al. ................. 250/227 |
| 3,936,878 | 2/1976 | Chrysler ............................. 250/227 |
| 4,295,043 | 10/1981 | Eibner et al. ..................... 250/227 |
| 4,373,471 | 2/1983 | Coulbourn ........................ 250/221 |
| 4,406,530 | 9/1983 | Hasegawa et al. ............... 250/221 |
| 4,449,043 | 5/1984 | Husbands .......................... 250/227 |
| 4,502,823 | 3/1985 | Wronski et al. .................. 250/221 |

Primary Examiner—David C. Nelms
Assistant Examiner—Lark W. Madoo
Attorney, Agent, or Firm—Doulgas L. Weller; Roland I. Griffin

[57] ABSTRACT

A safety device for a light signal generator only activates a laser beam emerging from an optical fiber connector when an optical fiber is connected. By inserting a plug of the optical fiber into the connector of the light signal generator a photodetecting circuit is caused to provide a control signal, which activates the laser.

4 Claims, 3 Drawing Figures

SAFETY DEVICE FOR CONTROLLING A LIGHT SIGNAL GENERATOR BASED ON FIBER POSITION

BACKGROUND

In electrical equipment which emits laser light signals to a connected optical fiber, precautions need to be taken to prevent high energy laser light from escaping from the equipment when the optical fiber is not connected, thus endangering the eyesight of an operator.

In the prior art, a safety device comprising a mechanial shutter which only opens when a optical fiber is connected could serve to prevent the escape of laser light. However, such use of a mechanical device could damage the optical fiber, as optical fibers are extremely delicate mechanically, and are frequently manufactured with tolerances in the micrometer range.

SUMMARY OF THE INVENTION

A safety device for a light signal generator is provided in accordance with a preferred embodiment of the present invention. A photodetector detects light from a light source. When an optical fiber is connected to the light signal generator, the photodetector no longer detects light from the light source and a control signal is activated which allows the light signal generator to emit laser light. If no optical fiber is connected to the light signal generator, no control signal is activated and the light signal generator cannot emit laser light.

In an alternative embodiment of the present invention a light source emits light which is detected by a photodector only when an optical fiber is connected to the light signal generator. When an optical fiber is connected, light emitted from the light source is reflected off the optical fiber and is detected by a photodector, and a control signal is activated which allows the light signal generator to emit laser light. If no optical fiber is connected to the light signal generator, no control signal is activated and the light signal generator cannot emit laser light.

DESCRIPTION OF THE PREFERRED EMBODIMENTS

Figure 1:
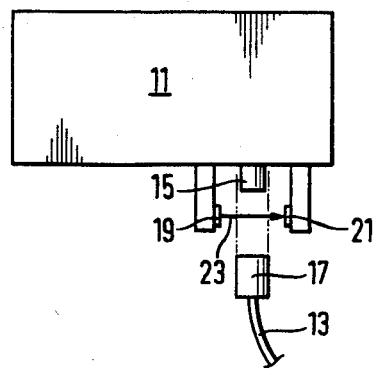
FIG. 1 shows a first embodiment of a safety device for a light signal generator in accordance with the present invention.

Reference 11 in FIG. 1 indicates a light signal generator which comprises a laser and an output plug assembly in the form of a connector socket 15 for the connection of a plug 17 of an optical fiber 13. The laser is only activated for the emission of a light beam via connector socket 15 by way of an electronic circuit as defined later in conjunction with FIG. 3, when the plug 17 of the optical fiber 13 is inserted in connector socket 15, and thus a control light beam 23 emitted by a control light source 19 no longer impinges on a photodetector 21.

Figure 2:
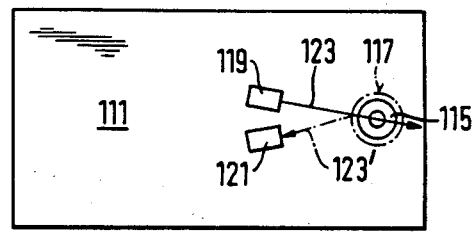
FIG. 2 shows a second embodiment of a safety device for a light signal generator in accordance with the present invention.
Figure 3:
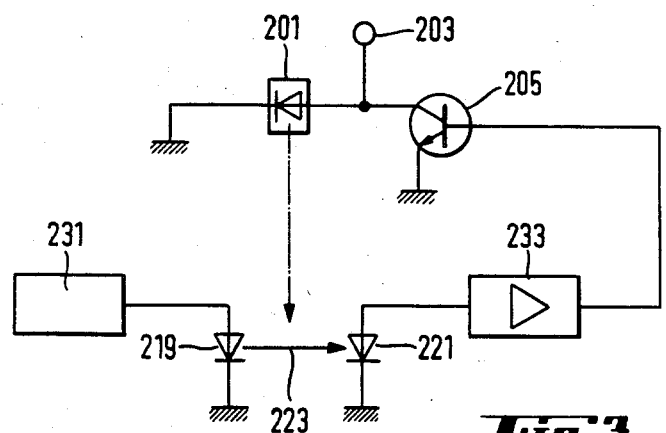
FIG. 3 is a simplified circuit diagram of the safety device as shown in FIGS. 1 and 2.

In the exemplary embodiment as shown in FIG. 2, a control light source 119 is arranged with respect to a photodetector 121 in such a way, that the photodetector will only activate the laser of a light signal generator 111 for the emission of light via an electronic circuit in accordance with FIG. 3, when a control light beam 123 is deflected 123' toward the photodetector 121 by way of a plug 117 (indicated by dashes) inserted in a connector socket 115.

In both exemplary embodiments laser light is prevented from exiting from the light signal generators 11 and 111 when an optical fiber is not connected. The exemplary embodiment in accordance with FIG. 2, however has additional safeguards, in that the laser is not activated unless the light source 119 and the photodetector 121 are actually functioning and the deflection 123' of the control light beam 123 by way of the plug 117 is not impaired by contamination.

FIG. 3 is a schematic circuitry layout which is suitable for a safety device in accordance with FIG. 1, as well as a safety device in accordance with FIG. 2. FIG. 3 shows a laser 201 which on one side is connected to ground, and on the other to a control connection 203. The control connection 203 is connected to ground via a switching transistor 205. When the switching transistor 205 is switched on, the control connection 203 is grounded, and the laser 201 is disabled.

Reference 219 denotes a light source in the form of a light emitting diode which is supplied by a drive circuit 231 of a conventional design. A light beam 223 originating from the light source 219 impinges on a photodetector 221 provided that there is no barrier (FIG. 1), or that a reflection occurs (FIG. 2). The photodetector 221 is on one side connected to ground and on the other to the input of an amplifier 233. The output of the amplifier 233 is connected to base of the switching transistor 205. The output signal of photo detector 221 is "on" when photodetector 221 detects light from light source 219, and "off" when photodector 221 does not detect light from light source 219. Depending on the output signal of the photodetector 221, the amplifier 233 provides a control signal to the switching transistor 205 for the activation or inactivation of the laser 201.

In the exemplary embodiment as shown in FIG. 1, the switching transistor 205 closes when the photodetector 221 provides an "on" output signal, thus the grounding control connection 203, and opens when the photodetector provides an "off" output signal, thus activating the laser.

In the embodiment of FIG. 2 this is reversed. The switching transistor 205 closes when the photodetector 221 provides an "off" output signal, thus grounding the control connection 203, and opens when the photodetector provides an "on" output signal, thus activating the laser.

What is claimed is:

1. A safety device for a light signal generator which emits light signals to an optical fiber, the safety device comprising:
    light emitting means coupled to the light signal generator, for emitting light; and
    photodetecting means coupled to the light signal generator for detecting light from the light emitting means, wherein the photodetector means provides a control signal to the light signal generator when the optical fiber is coupled to the light signals generator, and wherein the light signal generator is activated to emit light only when the photodetector means provides the control signal.

2. A safety device as in claim 1 wherein the photodetecting means detects light from the light emitting means when the optical fiber is coupled to the light signal generator, and does not detect light from the light emitting means when the optical fiber is not coupled to the light signal generator.

3. A safety device as in claim 1 wherein the photodetecting means detects light from the light emitting means when the optical fiber is not coupled to the light signal generator, and does not detect light from the light emitting means when the optical fiber is coupled to the light signal generator.

4. A safety device as in claim 2 wherein the optical fiber comprises a plug, and wherein the photodetecting means detects light from the light emitting means reflected off the plug when the plug is coupled to the light signal generator.

* * * * *

UNITED STATES PATENT AND TRADEMARK OFFICE
CERTIFICATE OF CORRECTION

PATENT NO. : 4,598,199

DATED : July 1, 1986

INVENTOR(S) : Christian Hentschel, Wolfgang Schmid

It is certified that error appears in the above-identified patent and that said Letters Patent is hereby corrected as shown below:

Attorney, Agent or Firm, "Doulgas L. Weller", should read
-- Douglas L. Weller --.

Signed and Sealed this

Twenty-third Day of September 1986

[SEAL]

Attest:

DONALD J. QUIGG

Attesting Officer

Commissioner of Patents and Trademarks